(12) United States Patent
Keithley et al.

(10) Patent No.: US 6,693,723 B2
(45) Date of Patent: Feb. 17, 2004

(54) IMAGE FORMING DEVICE FAST DRAFT PRINT MODE

(75) Inventors: Douglas G. Keithley, Boise, ID (US); Brent D. Rasmussen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 574 days.

(21) Appl. No.: 09/759,872

(22) Filed: Jan. 12, 2001

(65) Prior Publication Data

US 2002/0126305 A1 Sep. 12, 2002

(51) Int. Cl.[7] .......................... G06K 15/00; H04N 1/393
(52) U.S. Cl. ......................................... 358/1.2; 358/451
(58) Field of Search ........................ 358/448, 1.2, 451, 358/1.15, 401, 411

(56) References Cited

U.S. PATENT DOCUMENTS

| | | | |
|---|---|---|---|
| 4,578,689 A | 3/1986 | Spencer et al. ............. 346/160 |
| 4,700,201 A | 10/1987 | Sato ............................ 346/108 |
| 4,717,925 A | 1/1988 | Shibata et al. .............. 346/108 |
| 4,734,715 A | 3/1988 | Shiraishi ..................... 346/108 |
| 4,742,363 A | 5/1988 | Shiraishi ..................... 346/108 |
| 4,899,176 A | 2/1990 | McQuade ................... 346/108 |
| 4,953,036 A | 8/1990 | Yoshimura .................. 358/400 |
| 5,072,303 A | 12/1991 | Silverberg .................. 358/296 |
| 6,104,420 A | * 8/2000 | Matsumoto ................. 347/133 |
| 6,271,933 B1 | * 8/2001 | Asai ........................... 358/1.2 |
| 6,570,671 B1 | * 5/2003 | Yamaguchi ................. 358/1.16 |

FOREIGN PATENT DOCUMENTS

EP          0533486 A2      3/1993

* cited by examiner

Primary Examiner—Jerome Grant, II
(74) Attorney, Agent, or Firm—Anthony J Baca

(57) ABSTRACT

An image forming device having a fast draft mode accomplished by speeding up the media through the image forming device but not changing the image data rate. The image data is scaled to compensate for the increased media speed. The image data may also undergo enhancement processes to increase the quality of the printed image.

16 Claims, 12 Drawing Sheets

FIG. 5

| 1 | 2 | 0 |
|---|---|---|
| 2 | 4 | 0 |
| 0 | 0 | 0 |

| a | b | c |
|---|---|---|
| d | e | f |
| g | h | i |

FIG. 8

Normal    Draft

IMAGE FORMING DEVICE FAST DRAFT PRINT MODE

FIELD OF THE INVENTION

This invention generally relates to laser printers and more particularly, this invention relates to a laser printer having selectable printing resolutions.

BACKGROUND OF THE INVENTION

Within the last decade, laser printers have become the standard against which all other printers are measured in the personal computing industry. Understandably, a large amount of research has been recently undertaken to increase their versatility and print quality. This has resulted in the development of personal laser printers having resolutions in excess of 1200 DPI (dots-per-inch).

FIG. 1 of the attached drawings shows a representational diagram of a basic laser printer configuration, to which the reader is referred to aid in the following explanation of the electrophotographic process for recording and registering an image on paper. In general terms, a computer, or similar device, sends a series of codes representing an image to the input port 27 of the laser printer. The laser printer converts the codes to a series of binary signals, each of which generally represents one dot of the thousands of dots which together form the image. The binary signals are used to pulse the beam of a laser such that the binary pattern is represented or transmitted by turning off and on the laser. This pattern is then recorded on a light sensitive drum which transfers the pattern onto a printing medium, such as paper, in the form of toner or a similar indelible substance. In general terms, an image forming device of this nature has two main components, a raster image processor for processing the image and a print engine to fix the image to media.

As can be seen in FIG. 1, once the data has been transmitted to the laser printer it is analyzed in Formatter 11, here consisting of a microprocessor 23 and related memory 24 and buffer 12. Formatter 11 parses out the printer control commands from the text and graphics, and manipulates the text and graphics in accordance with the printer control commands and user input control codes from user input and display panel 25. Once the page has been formatted, it is transmitted to the buffer 12. Data is then sent to a circuit which drives the laser 13.

The data is used to modulate a light beam produced by laser 13. The modulation of the beam is accomplished by laser driver-controller 26. The laser beam is then reflected off of a multifaceted, spinning mirror 14. Here, the multifaceted mirror is shown as a six sided polyhedron, however as few as two facets are common. As each facet of the mirror 14 spins through the light beam, it reflects, or "scans", the beam across the side of a photoconductive drum 15. The photoconductive drum 15 is rotated about its axis such that it advances just enough that each successive scan of the light beam is recorded immediately after the previous scan directly on the photoconductive drum 15. In this manner, each strip of data from the buffer 12 is recorded on the photoconductive drum 15, as a line one after the other to reproduce the page on the drum.

The laser beam actually discharges the area on the photoconductive drum 15 it irradiates. The photoconductive drum 15 is first charged using a high voltage primary corona wire, shown at 16, to have a negative polarity at its surface. Because of the special photoconductive material which covers the drum, the laser beam effectively discharges any areas which it irradiates. This process creates a "latent" electrostatic image on the drum. This portion of the drum then comes into close proximity to the developing roller 17 which rotates counter clockwise, or opposite to the photoconductive drum 15. The developing roller 17 transfers the toner from the toner bath to the photoconductive drum 15. Here, a dry toner is used which consists of fine thermoplastic particles impregnated with a ferromagnetic material such as iron. The developer roller 17 uses the negative pole of an internal magnet to attract the toner. Triboelectric charging results in a negative charge to the particles themselves. The developer roller 17 is electrically biased so as to repel the charged toner to the image areas. In this manner, the toner is transferred to the photoconductive drum 15 and forms a pattern thereon which duplicates the image.

The toner is transferred from the photoconductive drum 15 to the printing medium, e g. paper 18, using an electrostatic process. Media drive system 28 advances the sheet of media through the printer. Here a second corona wire, transfer corona 19, is used to impart a relatively strong positive charge to the back side of the paper 18 as it passes by the photoconductive drum 15. The high positive charge attracts the negatively charged toner and pulls it from the drum, maintaining the same pattern. The toner is then fused to the paper 18 by passing both the toner and paper through a pair of hot fusing rollers 20.

The photoconductive drum 15 usually has a circumference which is less than the length of most paper. Hence, the drum must rotate several times to print a full sheet. The drum is cleaned with cleaning blade 21, completely discharged by discharge lamps 22 and recharged by corona 16.

The following discussion concerns references, of which the inventors are aware, showing technologies and improvements related to the instant invention. U.S. Pat. No. 4,578, 689 issued March, 1986 to SPENCER ET AL. for a Dual Mode Laser Printer teaches a laser printer having two modes for printing at different resolutions. The first is a high speed/low resolution mode and the second is a low speed/high resolution mode. The disclosure claims that the printer is capable of printing up to 16 pages per minute in low resolution mode, i.e. less than 400 DPI (dots-per-inch), and at approximately 4 pages per minute in high resolution mode, i.e. above 500 DPI. The printer accomplishes this by changing the speed of the paper drive and photoconductive drum using stepper motors, adjusting the heat produced by the fuser, adjusting the corona current in the electrophotographic process, controlling the laser output power and controlling the number of facets of the rotating mirror which are actually used to scan the photoconductive drum. The speed of the rotating mirror is kept constant regardless of the resolution selected. When reducing both the speed of the paper and the photoconductive drum, only every other, or fewer, facets of the rotating mirror are used, thus allowing enough time to elapse to permit the information to be accumulated without increasing the data transfer rate to the printer.

U.S. Pat. No. 4,700,201 issued October, 1987 to SATO for a Dot Corrected Laser teaches an image enhancement technique which varies the size of the dot produced dependant upon whether the dot is relatively isolated, e.g. not completely surrounded by other dots immediately adjacent to it, or in a densely populated area of the image. If a particular dot is determined to be isolated, the invention will increase the size of the dot by varying the duty cycle of the laser. In a positive exposure system, the "on time" of the laser is increased while in a negative exposure system the "off time" of the laser is increased. The invention uses either a modified driver circuit or an acousto-optic modulator to control the duty cycle of the irradiation to vary the spot or dot sized produced.

U.S. Pat. No. 4,717,925 issued January, 1988 to SHIBATA ET AL. for an Optical Scanner Without Extra Convergent Lens teaches a scanner error correction device which is similar in concept to that described in U.S. Pat. No. 4,613,877 discussed above. Additionally, this patent teaches an adjustable intensity laser beam using a photodetector, cooperating driver controller and laser driver to continuously adjust the intensity of the beam. As the data video rate increases, the intensity of the beam is increased to provide a uniform spot or dot size regardless of the shortened duty cycle.

U.S. Pat. No. 4,734,715 issued March, 1988 to SHIRAISHI for a Variable Light Beam Scanning Apparatus teaches a variable resolution laser printer. The variable resolution is accomplished by controlling the scan velocity of the laser beam, the video data frequency at which the laser beam is modulated and the spot diameter or dot size. The scan velocity of the laser beam is varied by controlling the rotational speed of the polyhedron faceted mirror, while the video data rate or frequency is varied by adjusting the clock rate and the laser spot diameter is varied by controlling the drive current supplied to the laser diode.

U.S. Pat. No. 4,742,363 issued May, 1988 to SHIRAISHI for a Variable Intensity Light Beam Scanning Apparatus With Feedback teaches essentially the same laser printer disclosed in U.S. Pat. No. 4,734,715 but concentrates on the circuit for controlling the light intensity of the laser beam produced by the laser diode by controlling the drive current.

U.S. Pat. No. 4,899,176 issued February, 1990 to MCQUADE for a Method of Reducing Average Data Rate in Rotating Mirror Laser Recorder teaches a method and apparatus for matching the rate at which the laser printer processes data to the rate at which the host device, such as a personal computer, supplies data to be printed. This is accomplished by reducing the number of facets of the polyhedron mirror which are actually used to scan data lines and also reducing the paper travel rate through the electrophotographic process.

U.S. Pat. No. 4,953,036 issued August, 1990 to YOSHIMURA for a Digital Copier Having Switchable Pixel Densities teaches a digital copy machine/laser printer having a high resolution mode (in excess of 400 DPI) for digital copy reproduction and a low resolution mode (240/300 DPI) for printing as a laser printer. The resolution switching is provided by one or more of the following configurations including: two separate lens systems, one for producing a reduced dot size and one for the regular dot size; a single lens system positionable at different points in the optical path of the laser to vary the spot size; changing the illumination time of the laser beam; or changing the rotational speed of the polyhedron mirror.

U.S. Pat. No. 5,072,303 issued December, 1991 to SILVERBERG teaches a laser printer which acts both as a standard 300 DPI laser printer and as a device for receiving and printing fax images. The printer is capable of printing in a 300×300 DPI laser printer mode, a 200×200 DPI "fine" fax mode and a 100×200 "normal" fax mode. The patent further teaches controlling the spot size produced by the laser diode using pulse width modulation of the drive signal or by controlling the drive current supplied to the laser light source.

Unfortunately, all of the prior art solutions of which the inventors are aware require alteration of almost the entire image forming device system including the paper path speed, laser scanner, fuser, supporting electronics and firmware. Additionally, because of the focus on increasing resolution, print engines are currently designed around higher and higher resolutions, resulting in "draft modes" with unnecessarily high resolutions which take longer to print and use more toner than necessary.

SUMMARY OF THE INVENTION

One embodiment of the invention has an image forming device including a fast draft mode accomplished by speeding up the media through the image forming device and scaling the image data in hardware, separate from the firmware. Optionally, the image can also be enhanced to improve image quality.

By speeding up the media path, commonly referred to as the paper path, and not the scanner, fewer print lines are needed per page. Because fewer lines are printed per page of data the aspect ratio must be altered to maintain a full page printout. A scaling apparatus is used to shrink the electronic image vertically by the inverse of the amount the speed has been increased resulting in an image having the same aspect ratio as the original. By implementing the scaling apparatus in hardware inside the print path and outside of the firmware, the firmware only has to deal with the image in its original size. The image source is independent of the media path speedup. Additionally, the scaling apparatus can be programmed to scale the image to an appropriate size to match any engine speedup, thereby allowing the design to be easily matched to whatever speedup amount a particular engine design can attain. For any particular print engine the amount of output path speedup is limited by the physical limits of the motor, driver and fuser as well as the amount of output quality degradation that is acceptable in draft mode.

Another embodiment of the invention provides image enhancement of draft mode images. A first order enhancement uses a filter to add dots below and to the right of any existing dot to produce a printed image which is nearly as bold as the original image. Another embodiment adds dots above and to the left of any existing dot. If sub-pixel modulation is available, an additional order of enhancement can be accomplished by a second filter to smooth edges and attempt to fill and correct gaps between the lines. Another embodiment increases the boldness of the printed image by increasing the power to the laser to increase its density setting. Another embodiment adjusts the developer bias to increase the density. Another embodiment optimizes templates and filters for each printing speed. Another embodiment utilizes a multi-bit scaler in place of the one bit scaler to produce additional information about the scaled dots which can be used to further enhance the image. Other embodiments use combinations of the previously mentioned embodiments.

DESCRIPTION OF THE DRAWINGS

FIG. 5 is a pixel/dot matrix for the character "A".

FIG. 6 is a pixel/dot matrix of FIG. 5 with each pixel filled in.

FIG. 8 is a filter coefficient matrix.

DETAILED DESCRIPTION OF THE PREFERRED EMBODIMENT

The preferred embodiment of the present invention provides printer 10 with at least two printing modes. A first mode provides normal high quality output; a second mode provides high speed draft quality output. As will be described in greater detail below, in the preferred embodiment draft mode is accomplished by moving the media through the printer at a higher rate than normal mode without changing the rate image data is put on the media. To compensate for the increased paper speed, the original image is scaled. To improve image quality, the image may undergo image enhancement.

Figure 1:
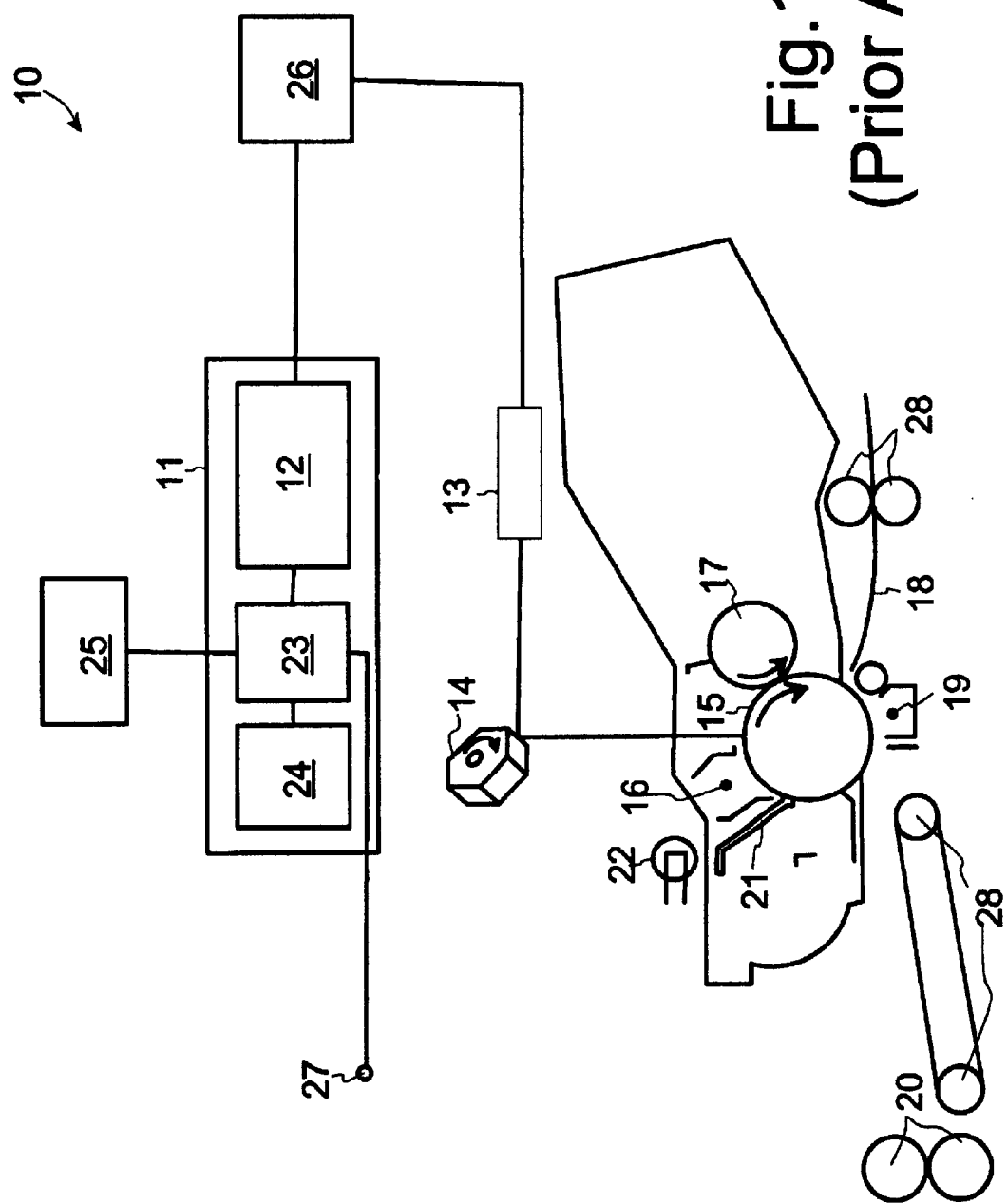
FIG. 1 is a block diagram schematic of an image forming device, here a laser printer.
Figure 2:
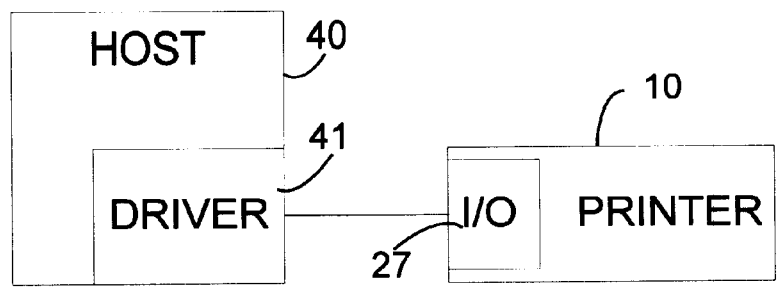
FIG. 2 shows the environment of the preferred embodiment of the present invention.

Referring first to FIG. 2 which shows an image forming system in accordance with the preferred embodiment of the present invention. Host computer 40 uses driver 41 to interact with printer 10. Similarly, printer 10 uses I/O 27 to interact with Host 40.

Figure 3:
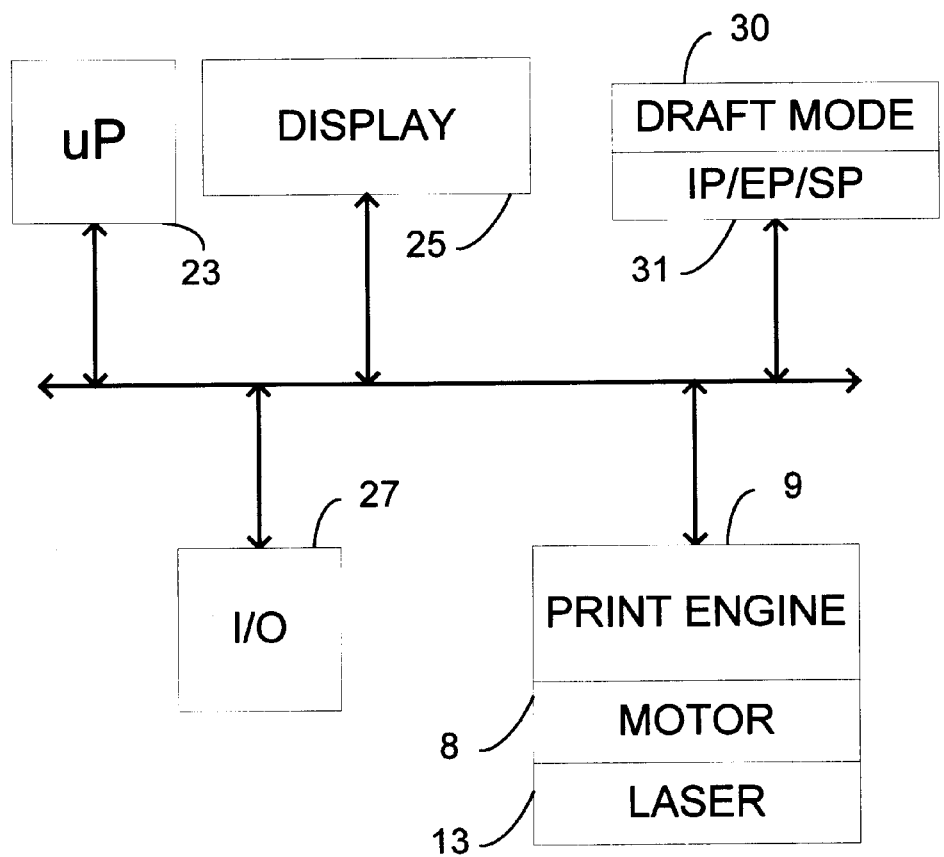
FIG. 3 provides a high level illustration of data flow through the printer.

FIG. 3 illustrates more details about the internal functions of Printer 10. I/O 27 provides communication between the printer and external devices such as a host computer. Microprocessor 23 executes stored programs thereby controlling the printer. Print engine 9, which includes variable speed media motor 8 and laser 13, produces the physical output of the printer. In the preferred embodiment, print engine 9 uses a laser electrophotographic process as described above, however, the present invention may be used with other types of printing processes such as ink jet, thermal wax, and impact. Draft mode 30 and image processing 31 provide the draft mode; each may be implemented in hardware, firmware, or software or any combination thereof.

Figure 4:
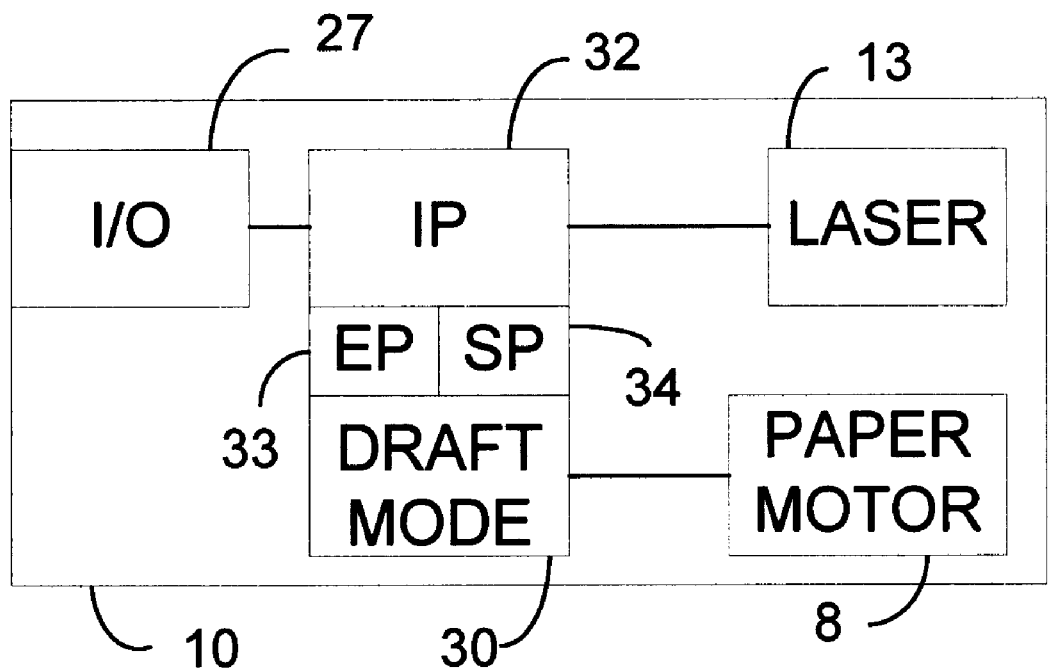
FIG. 4 illustrates more details about the internal functions of Printer 10.

Referring now to FIG. 4, data is first received by the I/O module 27. This data is processed in accordance with the printer language by the Image Processor (IP) 32. IP 32 receives the data from I/O module and prepares the data for printing. Image data from IP is passed to the laser 13 in the print engine. If the printer is operating in the draft mode 30, the rate at which the print engine motor 8 moves the paper through the printer is programmed to an increased speed. Additionally, the image data from the IP must pass through the Scaling Processor (SP) 34 before it is sent to the laser 13. The SP 34 scales the original image data, as described herein, to compensate for the increased speed of the paper.

Optionally, the image data may undergo enhancement processing (EP 33) before or after scaling thereby improving the image quality. For example, the image may need to be darkened, edges may be smoothed, or halftone images may be sub-sampled.

Figure 5:
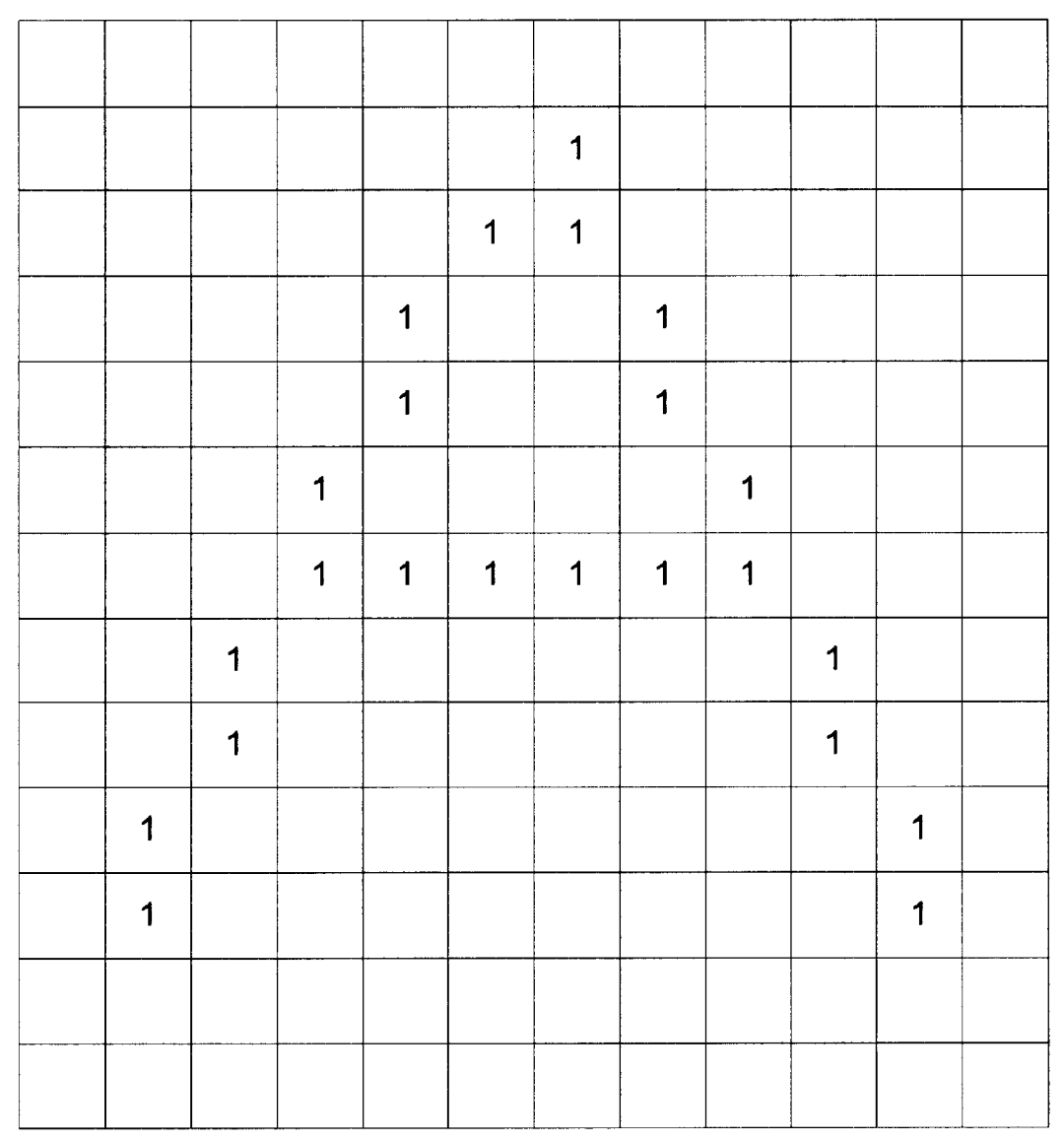
Figure 6:
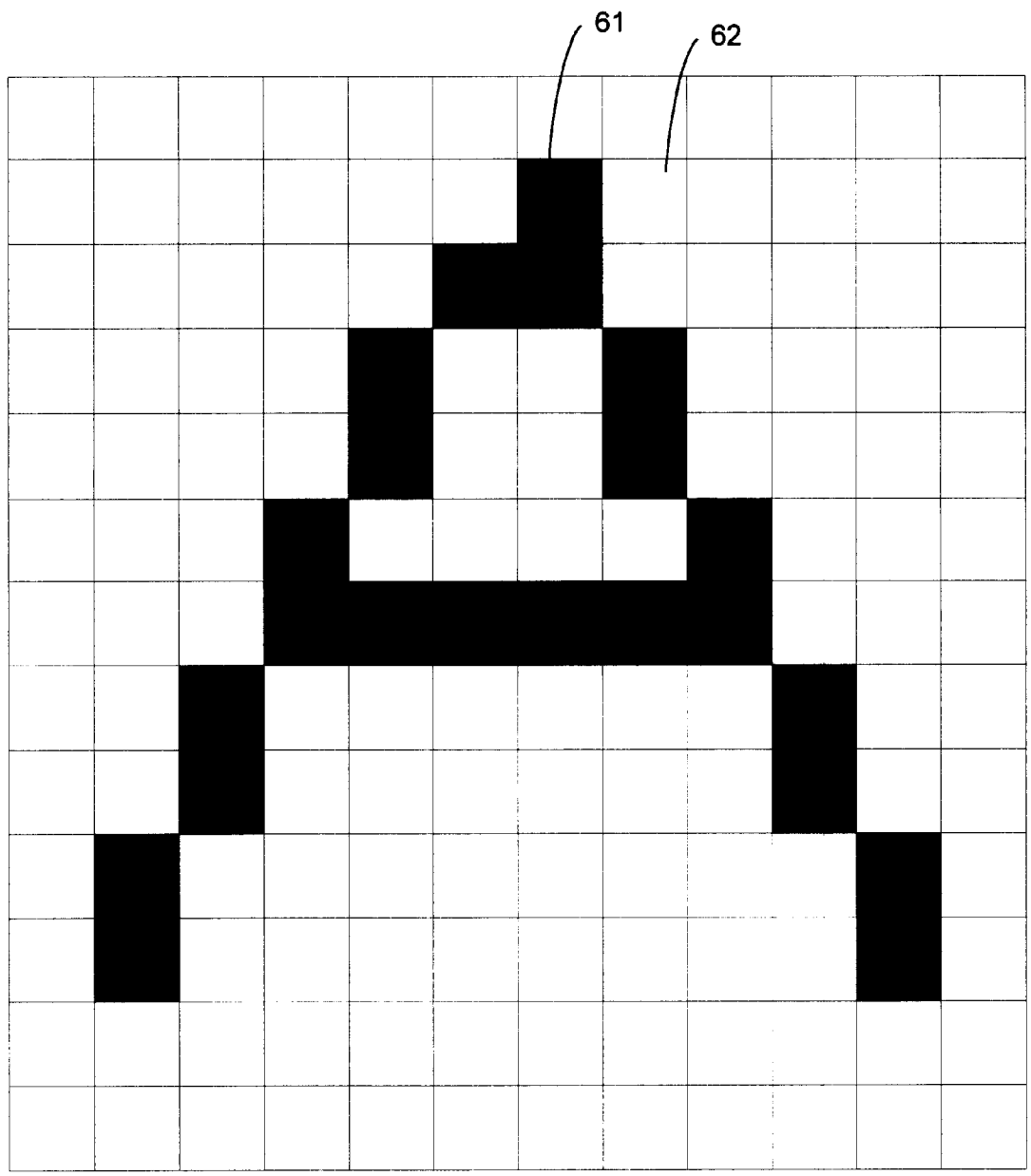
Figure 7:
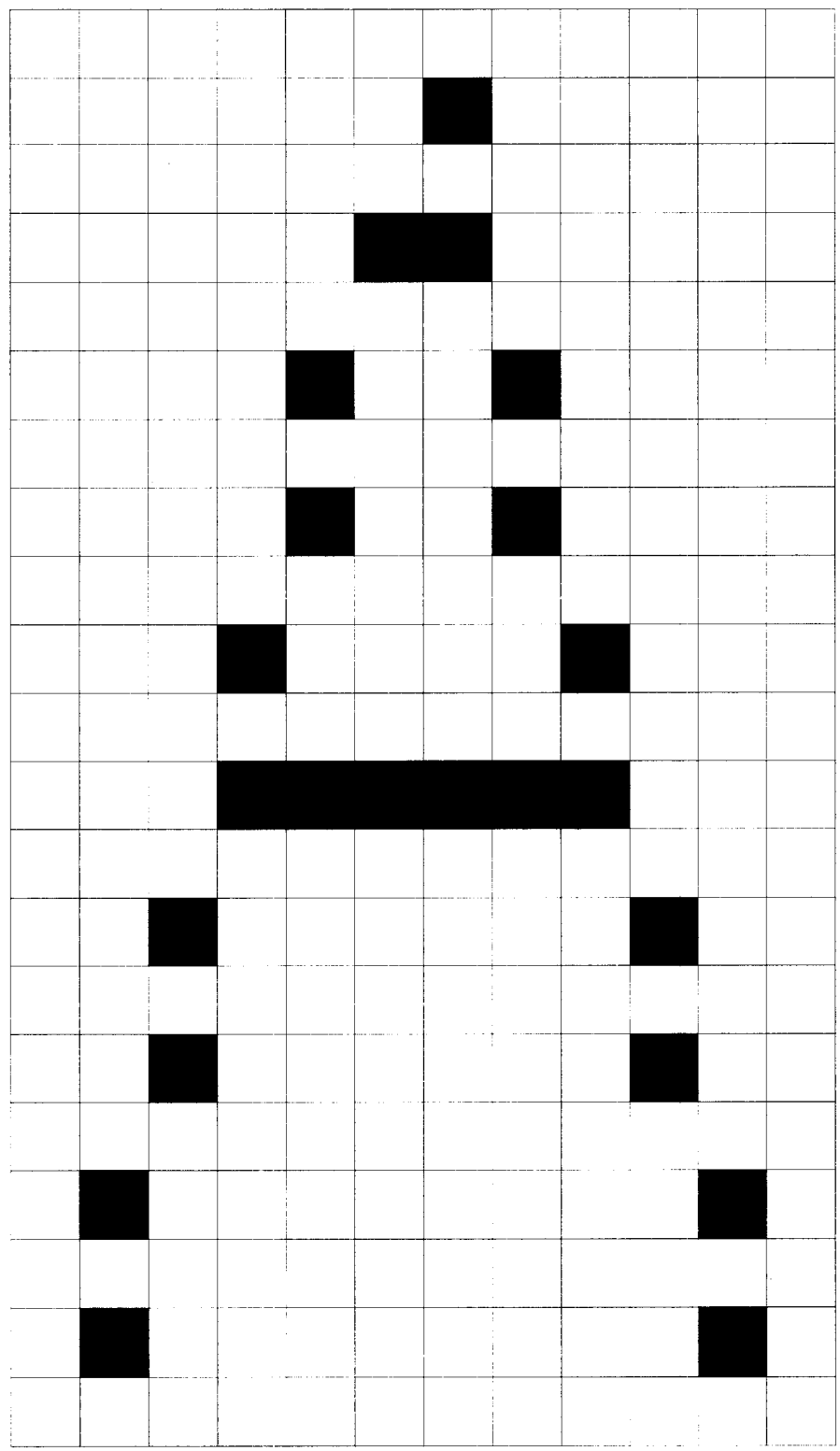
FIG. 7 is a pixel/dot matrix showing the result of increasing the linear speed of the paper by 2× and performing no processing or scaling of the image data.

FIG. 5 shows a pixel/dot matrix of the letter A where a "1" in a matrix cell indicates the presence of a dot. FIG. 6 shows the same "A" with each pixel filled in. FIG. 7 shows the result of increasing the linear speed of the paper by 2× and performing no processing or scaling of the image data. From this figure you can see that the printed latter "A" is twice as long as the original latter "A". While it may not be apparent from these figures, the resulting "A" in FIG. 7 is also lighter and has a more jagged edge.

To correct for the effects of increasing the paper speed, the image is scaled.

Once the amount of speed increase is set, the image is scaled proportionately to the increased output speed according to the formula:

$$Y_n = (Y_0)/(1+X) \qquad \text{eq. 1}$$

where $Y_0$ is the original resolution in the direction of media movement, X is the percent change in output speed and $Y_n$ is the new resolution in the direction of media movement. This is accomplished by scaling processor 32. For example, if the paper speed is increased 50%, the number of lines in the resulting scaled image must be reduced to 67% (1/(1+0.50)).

Figure 12:
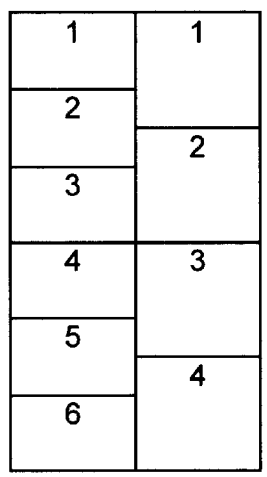
FIG. 12 shows the image data relationship for a %50 increase in linear speed of the paper.

By way of example, if X, the speed increase, is 0.50 then the first row of the DRAFT output is the normalized sum of the first row and half the value of the second row of the NORMAL input. Likewise, the second row of the DRAFT output is the normalized sum of the second half of the second row and the entire third row of the NORMAL input. This pattern repeats, first all of one line and half of the next, then half of the line plus all of the next. To simplify handling of the image data in the printer, the scaling operation is generally limited to outputting only integer numbers, for sake of clarity this is shown below by using an INT function. Scaling may be easier to visualize looking at a single column as shown in FIG. 12. The first DRAFT pixel covers all of the first NORMAL pixel and one half of the second pixel. The second DRAFT pixel covers only half of the second NORMAL pixel and all of the third NORMAL pixel. To normalize the DRAFT pixel value, the sum of the NORMAL pixels must be divided by 1.5 (1+50% speedup): the number of Normal pixels that the DRAFT pixel covers.

Figure 13:
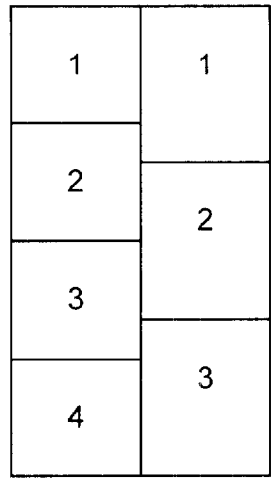
FIG. 13 shows the image data relationship for a %33 increase in linear speed of the paper.

FIG. 13 shows what happens for a 33% speedup. The first DRAFT pixel covers all of the first NORMAL pixel and only ⅓ of the second NORMAL pixel. The second DRAFT pixel covers ⅔ of the second NORMAL pixel and ⅔ of the third NORMAL pixel. To normalize the DRAFT pixel value, the sum of NORMAL pixels must be divided by 4/3 (1+33% speedup): the number of NORMAL pixels that a DRAFT pixel covers.

The output of the scaling process is a multi-bit per pixel representation of the scaled image. Thus, DRAFT image data is herein defined as dot characteristic data which, for example, may be used as a pulse width modulation value for the particular dot to alter the size, shape or intensity of the printed dot. The DRAFT image data may be sent directly to the print engine for imaging. The print engine uses the aforementioned Pulse Width Modulation to attempt to print the multi-bit per pixel data, thereby adding a level of enhancement. If the print engine can not accept multi-bit per pixel data then the data must be converted to a single bit per pixel image. There are a multitude of halftoning algorithms for such conversion. For simplicity and speed, a simple threshold process will generally produce acceptable results.

The above description of scaling the image data to match the increase in paper speed produces acceptable result. As will be described in more detail below, in the preferred embodiment, the original image data is darkened prior to scaling.

An image can be darkened by many means known in the art. The preferred embodiment uses a smoothing filter (eq. 2). The filter function in eq. 2 processes the image to optimize it for scaling by producing a dot pattern which, when scaled, will closely resemble the original image and provide additional pulse width modulation data for each dot.

$$F(x, y) = INT(255 * \min\{[a * f(x-1, y-1) + b * f(x, y-1) + \quad \text{eq. 2}$$
$$c * f(x+1, y-1) + d * f(x-1, y) +$$
$$e * f(x, y) + f * f(x+1), y) +$$
$$g * f(x-1, y+1) + h * f(x, y+1) +$$
$$I * f(x+1, y+1)]/\text{Weight}, 1\})$$

Figure 8:
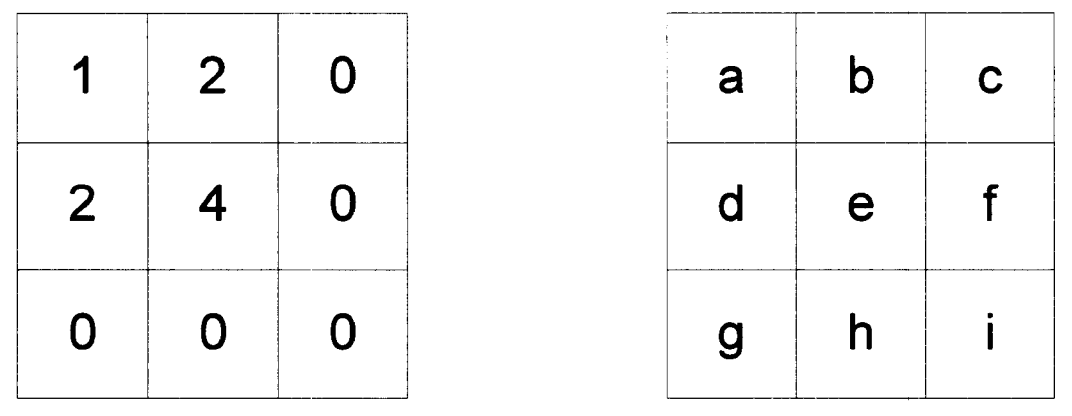

To achieve the darkening results the smoothing filter coefficients are selected so as to not normalize the filter's output as would normally be done. FIG. 8 shows the coefficient matrix used by the smoothing filter function of eq. 2. The matrix on the left-hand side of FIG. 8 indicates the values for the corresponding coefficients in the right-hand matrix.

In this particular embodiment, the filter function multiplies 255 by a calculated number between zero and one. The min{ } function, within the filter function, chooses the value of one or the value of the calculated portion, i.e. the portion within the [ ], whichever is less. The value of the variable "Weight" is used to weight the value of the filtered dot characteristic, thereby increasing the intensity value. Hence, this particular filter function will always return an integer number between 0 and 255. The effect of eq. 2 on two pixels (61 and 62) in FIG. 6 may aid the reader in understand the function. In this example, the Weight factor is 4. Inserting the Coefficients from FIG. 8:

$$F(x, y) = INT(255 * \min\{[1 * f(x-1, y-1) + 2 * f(x, y-1) +$$
$$O * f(x+1, y-1) + 2 * f(x-1, y) + 4 * f(x, y) +$$
$$O * f(x+1), y) + O * f(x-1, y+1) + O * f(x, y+1) +$$
$$O * f(x+1, y+1)]/4, 1\})$$

Which can be reduced to:

$$F(x, y) = INT(255 * \min\{[1 * f(x-1, y-1) + 2 * f(x, y-1) +$$
$$2 * f(x-1, y) + 4 * f(x, y)]/4, 1\})$$

Plugging in the Pixel values for pixel 61, which is at (x, y)=(6, 1):

$$F(6, 1) = INT(255 * \min\{[1 * f(5, 0) + 2 * f(6, 0) + 2 * f(5, 1) +$$
$$4 * f(6, 1)]/4, 1\})$$

Which reduces to:

$$F(6, 1) = INT(255 * \min\{[1 * 0 + 2 * 0) + 2 * 0 + 4 * 1]/4, 1\})$$

or:

$$F(6, 1) = INT(255 * \min\{1, 1\}) = 255$$

Similarly, Pixel 62 at (7, 1)

$$F(7, 1) = INT(255 * \min\{[1 * f(6, 0) + 2 * f(7, 0) + 2 * f(6, 1) +$$
$$4 * f(7, 1]/4, 1\})$$

or:

$$F(7, 1) = INT(255 * \min\{[1 * 0 + 2 * 0 + 2 * 1 + 4 * 0]/4, 1\})$$
$$F(7, 1) = INT(255 * \min\{0.5, 1\}) = INT(127.5) = 127$$

Figure 9:
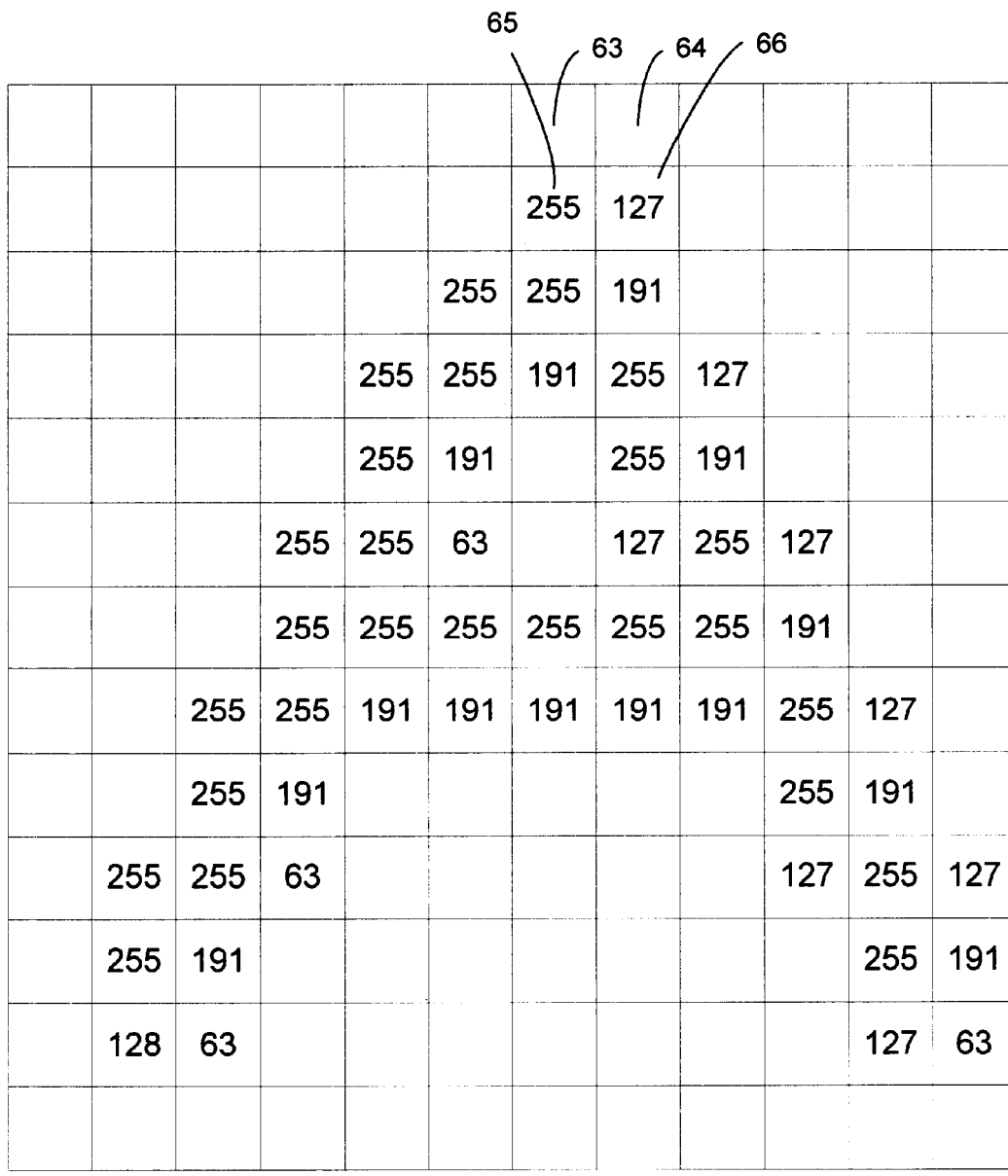
FIG. 9 is a pixel/dot matrix of a "Filter Matrix".

FIG. 9 shows the result of performing the filter function on the remaining pixels of FIG. 5.

As a result, the letter A of FIG. 5 is transformed from a single bit image of 0's and 1's to an 8-bit image. It should be noted that 8-bit image would take up 8× the memory if stored back in memory, however, this process can be done 'on-the-fly', so the increase in storage is only for a few lines, not the entire image.

Figure 10:
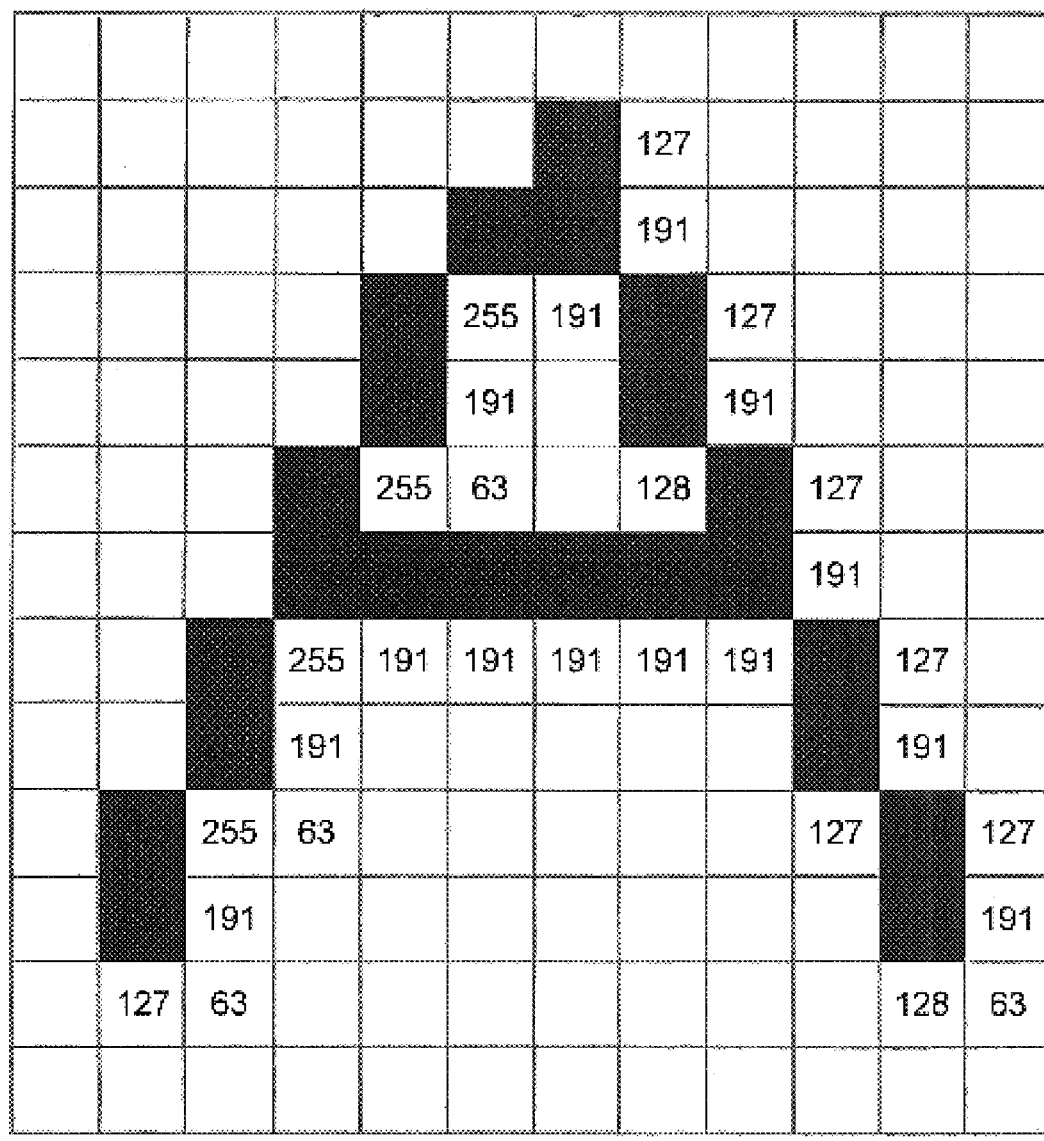
FIG. 10 is an overlay of FIGS. 6 and 9.

FIG. 10 shows the result with the enhanced dot matrix of FIG. 9 overlaying the original dot matrix of FIG. 6. It can be seen that this particular filter produces additional dots in the enhanced image which generally tend to be positioned below and to the right of the dots in the original image.

Once the image has been enhanced by image enhancement processor 33 the image is scaled proportionately to the increased output speed according to eq. 1 described above. As a result of the scaling, the image is shorter, that is it occupies less rows. Performing this scaling transformation on "Filter Matrix" FIG. 9 results in the "Anamorphic Matrix" of FIG. 11.

Looking at this scaling transformation in more detail. To calculate the values in the first row of the Anamorphic Matrix, the Filter Matrix (FIG. 9) data is processed. Each vertical column is calculated the same way. Pixels are defined by a row column notation: (r,c) where r is the row and c is the column. A(r,c) is the Anamorphic output and F(r,c) is the Filter Matrix input.

For the first row in the Anamorphic Matrix A:

$$A(1,c)=INT((F(1,c)+X*F(2,c))/(1+X))$$

Where X is the speed increase, 0.50 in this example.

Therefore, the first row of the Anamorphic Matrix is the normalized sum of the first row and half the value of the second row of the filtered matrix.

There are two non-zero values (67 and 68 of FIG. 11) in this row and are computed as, where $P_{xx}$ represents the value of the pixel at location xx:

$$P_{67}=INT(P_{63}+0.5*P_{65})/1.5)=INT(0+0.5*255)/1.5)=85 \text{ and}$$
$$P_{68}=INT(P_{64}+0.5*P_{66})/1.5)=INT(0+0.5*127)/1.5)=42$$

The next row in the Anamorphic Matrix A is calculated as:

$$A(2,c)=INT(((1-X)*F(2,c)+F(3,c))/(1+X))$$

There are three non-zero values (71, 72 and 73 of FIG. 11) in this line and they are calculated as:

$$P_{71}=INT((0.5*0+255)/1.5)=170$$
$$P_{72}=INT((0.5*255+255)/1.5)=255 \text{ and}$$
$$P_{73}=INT((0.5*127+191)/1.5)=169$$

This pattern repeats, first all of one line and half of the next, then half of the line plus all of the next.

Figure 11:
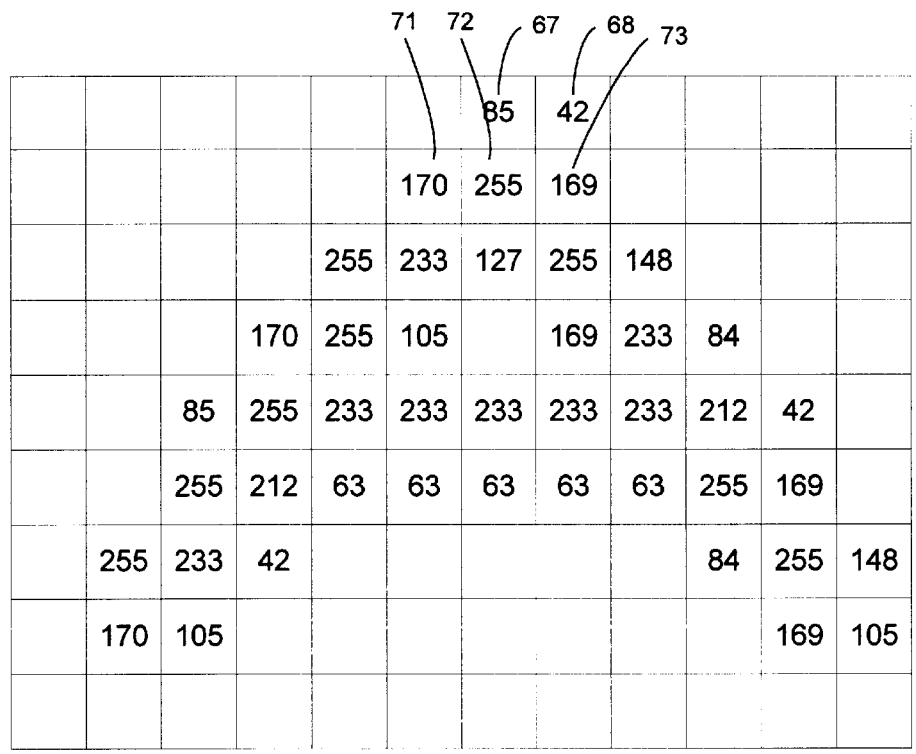
FIG. 11 is a pixel/dot matrix of an 'Anamorphic Matrix'.
Figure 14:
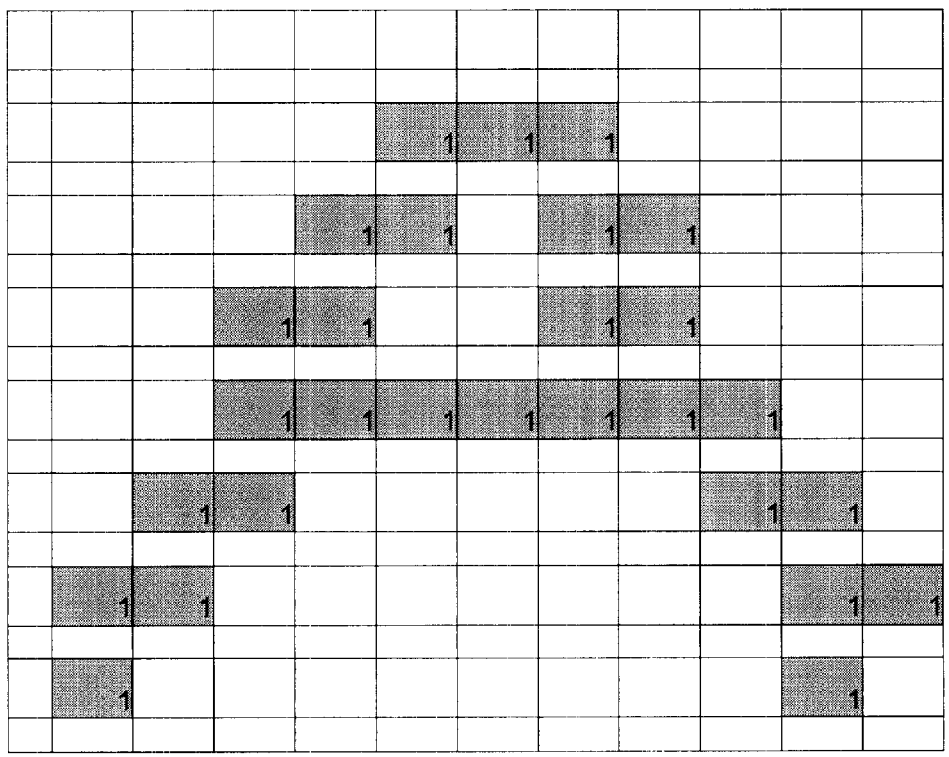
FIG. 14 is a pixel/dot matrix of a proportional draft mode character "A".

This image data of FIG. 11 is here defined as dot characteristic data which, for example, may be used as a pulse width modulation value for the particular dot to alter the size, shape or intensity of the printed dot. The image data of FIG. 11 may be sent directly to the print engine for imaging. The print engine may use Pulse Width Modulation to attempt to print the mult-bit per pixel data, thereby adding another level of enhancement. If the print engine can not accept mult-bit per pixel data then the data must be converted to a single bit per pixel image. There are a multitude of halftoning algorithms for such conversion. For simplicity and speed, a simple threshold process will generally produce acceptable results. Processing the image data with a threshold of 128 yields the single-bit per pixel image of FIG. 14. The vertical white space between elements and rectangular shape of the elements are for illustrative purposes only.

Figure 15:
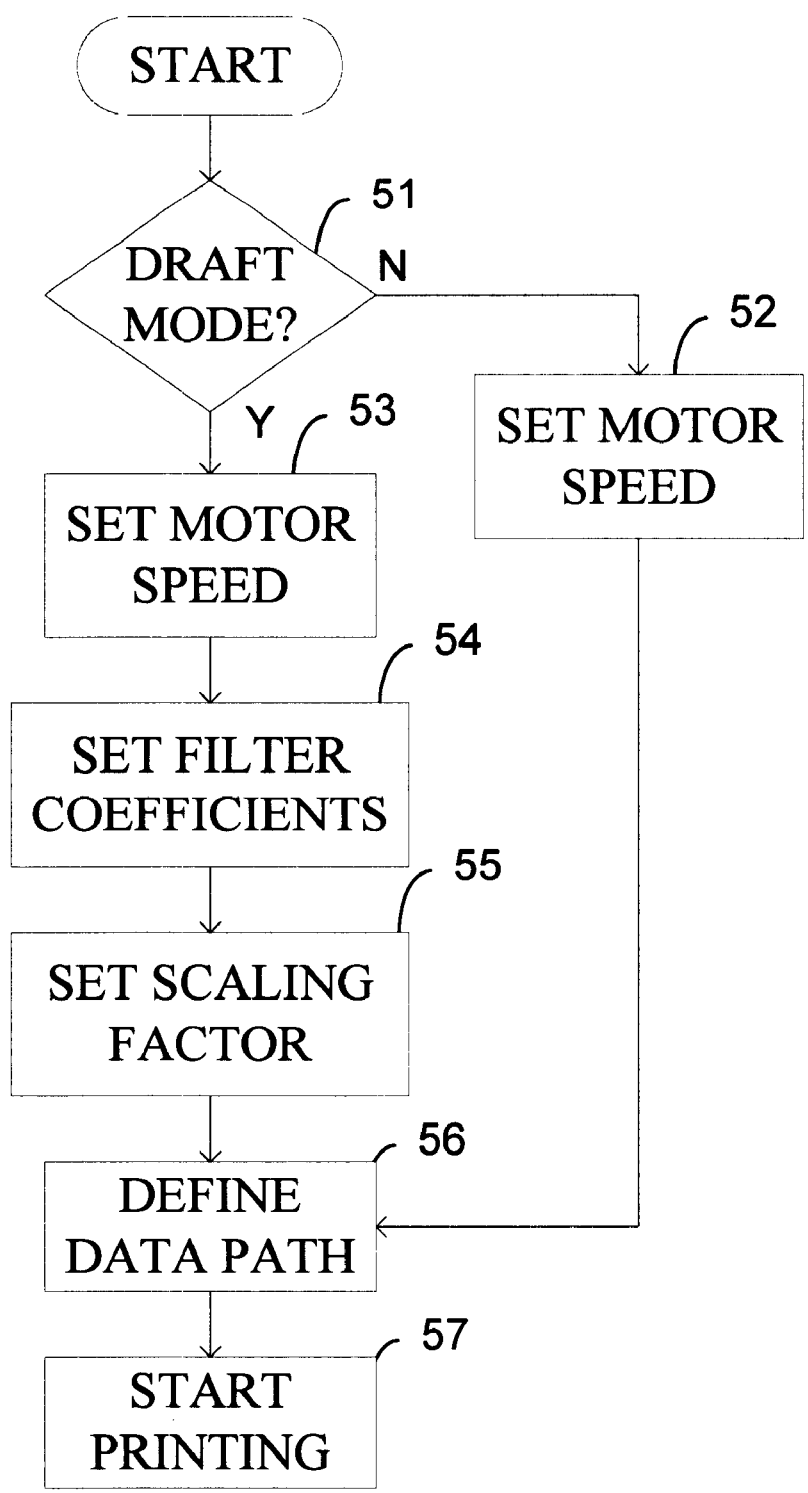
FIG. 15 a high level flow chart in accordance with the present invention.

Referring next to FIG. 15 a high level flow chart of the preferred embodiment is shown. The printer determines (51) if it is in draft mode or normal mode. If the printer is in normal mode, then the paper speed is set to normal (52) and printing occurs as it normally would (56 & 57). Alternatively, if the printer is in draft mode, the paper motor speed is set to the draft mode speed (53). The filter coefficients (54) and scaling factor (55) are set. The data path is defined such that the image data passes through the filter and scaler prior to being sent to the print engine. As described above, additional enhancement processes may also be performed on the data prior to sending the data to the laser.

It should be understood that the above description described processes within the printer for scaling and enhancement. One skilled in the art would understand that although the above processes of filtering and scaling are shown as separate processes, they may be combined into a single processes. These processes could be implemented in software, firmware of hardware. Additionally, while the above description described these processes as being performed in the printer, any such process may alternatively be performed in the host computer, with the resulting image data being sent to the printer. One skilled in the art will also understand that while the figures show each pixel as a square block, most printing techniques actually print using a circular or elliptical pixel.

While the present invention has been shown and described with reference to the foregoing embodiments, it is to be understood that other forms and alterations may be made thereto without departing from the spirit and scope of the invention. It should be understood, therefore, that the invention is to be construed broadly within the scope of the following claims.

What is claimed is:

1. An image forming system comprising:
   a host computer; and
   a printer in communication with the host computer, the printer further comprising:
   an image processor;
   a scaling processor;
   a variable speed media movement motor;
   a draft mode responsive to a draft mode command said draft mode using the variable speed media movement motor at a draft speed which is faster than a normal speed, the draft mode using the scaling processor to scale image data to compensate for the faster draft speed; and
   a print engine arranged to receive the image data.

2. The image forming system of claim 1, wherein the scaling processor scaling the image data according to the formula $Y_n=(Y_0)/(1+X)$ where $Y_0$ equals an original resolution value, X equals a percent change in output speed from an original speed to the draft mode speed and $Y_n$ equals a new resolution for the draft mode.

3. The image forming system of claim 1 further comprising:
   an enhancement processor responsive to the draft mode command to enhance the image data so that the print engine produces substantial same output independent of the speed of the variable speed media movement motor.

4. The image forming system of claim 3 wherein the enhancement processor further comprising a filter that darkens and smoothes the image data prior to scaling.

5. An image forming apparatus having a normal mode and a draft mode comprising:
   an I/O module operative to receive print data;
   an image processor operative to receive the print data from the I/O module;
   a variable speed media movement motor moving the media at a normal speed when the image forming apparatus is operating in the normal and moving the media at a draft speed when the image forming apparatus is operating in the draft mode;
   a scaling processor operative to receive image data from the image processor when the image forming apparatus is operating in the draft mode, the scaling processor scaling the image data to compensate for media moving at the draft speed; and
   a print engine operative to receive the image data.

6. The image forming system of claim 5, wherein the scaling processor scaling the image data according to the formula $Y_n=(Y_0)/(1+X)$ where $Y_0$ equals an original resolution value, X equals a percent change in output speed from an original speed to the draft mode speed and $Y_n$ equals a new resolution for the draft mode.

7. The image forming system of claim 5 further comprising:
   an enhancement processor responsive to the draft mode to enhance the image data so that the print engine produces substantial same output independent of the speed of the variable speed media movement motor.

8. An image forming apparatus comprising:
   a image processor;
   a processed image buffer connected to the image processor;
   a print engine connected to the processed image buffer;
   a media output system positioned to pass media through the print engine and having a variable speed responsive to a draft mode command;
   an image scaling processor selectably connected between the print engine and the processed image buffer and responsive to a draft mode command to scale the data according to the formula $Y_n=(Y_0)/(1+X)$ where $Y_0$ equals an original resolution value, X equals a percent change in output speed from an original speed to the draft mode speed and $Y_n$ equals a new resolution for the draft mode.

9. The image forming device of claim 4 wherein the image enhancement processor is configured to tend to generate an additional two dots for every original dot, placed either below and to the right thereof or above and to the left thereof, in an enhanced image.

10. The image forming device of claim 9 wherein the image enhancement processor contains a plurality of enhancement filters, each tuned to a different output speed.

11. The image forming device of claim 8 further comprising an image enhancement processor selectably connected between the processed image buffer and the image scaling processor to produce an enhanced dot image from an original dot image.

12. The image forming device of claim 11 wherein the image enhancement processor is configured to generate a value corresponding to at least one characteristic of each dot in the enhanced dot image.

13. The image forming device of claim 12 wherein the image enhancement processor contains a plurality of enhancement filters, each tuned to a different output speed.

14. The image forming device of claim 11 wherein the image enhancement processor contains a plurality of enhancement filters, each tuned to a different output speed.

15. The image forming device of claim 9 wherein the image enhancement processor is configured to generate a value corresponding to at least one characteristic of each dot in the enhanced dot image.

16. The image forming device of claim 15 wherein the image enhancement processor contains a plurality of enhancement filters, each tuned to a different output speed.

* * * * *

UNITED STATES PATENT AND TRADEMARK OFFICE
CERTIFICATE OF CORRECTION

PATENT NO.   : 6,693,723 B2
DATED        : February 17, 2004
INVENTOR(S)  : Keithley et al.

It is certified that error appears in the above-identified patent and that said Letters Patent is hereby corrected as shown below:

Column 5,
Line 24, after "detail below," delete "in"

Column 6,
Line 9, after "scaled." do not begin a new paragraph

Column 7,
Line 8, after "F(x, y) =INT(255*min{[a*f(x-1, y-1) + b*f(x, y-1)+" delete "eq. 2"
Line 15, after "I*f(x+1, y+1)]/Weight, 1})" insert -- eq. 2 --
Line 34, delete "understand" and insert therefor -- understanding --

Column 10,
Line 60, claim 9, should read
-- The image forming device of claim 8 further comprising an image enhancement processor selectably connected between the processed image buffer and the image scaling processor to produce an enhanced dot image from an original dot image. --
Line 65, claim 10, should read
-- The image forming device of claim 9 wherein the image enhancement processor is configured to tend ot generate an addditional two dots for every original dot. placed either below and to the right thereof or above and to the left thereof, in an enhanced image. --

Column 11,
Line 1, claim 11, should read
-- The image forming device of claim 10 wherein the image enhancement processor is configured to generate a value corresponding to at least one characteristic of each dot in the enhanced dot image. --
Line 6, claim 12, should read
-- The image forming device of claim 9 wherein the image enhancement processor is configured to generate a value corresponding to at least one characteristic of each dot in the enhanced dot image. --
Line 10, claim 13, should read
-- The image forming device of claim 12 wherein the image enhancement processor contains a plurality of enhancement filters, each tuned to a different output speed. --

UNITED STATES PATENT AND TRADEMARK OFFICE
CERTIFICATE OF CORRECTION

PATENT NO.    : 6,693,723 B2
DATED         : February 17, 2004
INVENTOR(S)   : Keithley et al.

It is certified that error appears in the above-identified patent and that said Letters Patent is hereby corrected as shown below:

Column 12,
Line 1, claim 14, should read
-- The image forming device of claim 11 wherein the image enchancement processor contains a plurality of enhancement filters, each tuned to a different output speed. --
Line 4, claim 15, should read
-- The image forming device of claim 10 wherein the image enchancement processor contains a plurality of enhancement filters, each tuned to a different output speed. --
Line 8, claim 16, should read
-- The image forming device of claim 9 wherein the image enchancement processor contains a plurality of enhancement filters, each tuned to a different output speed. --

Signed and Sealed this

Seventh Day of June, 2005

JON W. DUDAS
*Director of the United States Patent and Trademark Office*